United States Patent
Yokota (10) Patent No.: US 7,164,477 B2
(45) Date of Patent: Jan. 16, 2007

(54) INFRARED SPECTROMETER

(75) Inventor: Kazumi Yokota, Osaka-fu (JP)

(73) Assignee: Shimadzu Corporation, Kyoto (JP)

( * ) Notice: Subject to any disclaimer, the term of this patent is extended or adjusted under 35 U.S.C. 154(b) by 45 days.

(21) Appl. No.: 11/139,983

(22) Filed: May 31, 2005

(65) Prior Publication Data

US 2006/0268268 A1    Nov. 30, 2006

(51) Int. Cl.
*G01J 3/02* (2006.01)
*G01J 3/42* (2006.01)

(52) U.S. Cl. ...................... 356/319; 356/325
(58) Field of Classification Search ............... 356/319, 356/323, 324, 325
See application file for complete search history.

(56) References Cited

U.S. PATENT DOCUMENTS 4,070,112 A * 1/1978 Tsunazawa et al. ......... 356/319

6,721,048 B1 * 4/2004 Yokota et al. .............. 356/319

FOREIGN PATENT DOCUMENTS

JP    2002-062189    2/2002

* cited by examiner

*Primary Examiner*—F. L. Evans
(74) *Attorney, Agent, or Firm*—Westerman, Hattori, Daniels & Adrian, LLP.

(57) ABSTRACT

A detecting device for a spectrophotometer is provided which is capable of exhibiting a sufficient sensitivity and with an adequate linearity over the ultraviolet light, visible light and near-infrared light ranges. The spectrophotometer detecting device includes detectors of a photomultiplier-tube detector, an InGaAs detector and a PbS detector, and a switching device for switching among these detectors. Alternatively, the spectrophotometer may include a single integrating sphere including these three types of detectors placed thereon. The spectrophotometer may further include output conversion means for correcting the output linearity difference among these detectors.

8 Claims, 8 Drawing Sheets

INFRARED SPECTROMETER

TECHNICAL FIELD

The present invention relates to a detecting device for general spectrophotometers intended for wavelength ranges covering ultraviolet light, visible light and near-infrared light (generally, within the range of 150 to 3500 μm).

BACKGROUND ART

It is impossible to detect all wavelengths with a single detector in a general spectrophotometer covering a wide wavelength range as aforementioned. Therefore, conventionally, the wavelength range has been properly divided into plural regions on the basis of the frequency, and different detectors have been provided for the respective regions. In many cases, a photomultiplier tube (PMT) is utilized for the ultraviolet-light region and the visible-light region, while a PbS (plumbous sulfide) detector is utilized for the near-infrared light region. In some cases, respective wavelength ranges may be further divided into plural regions, and detectors of the same type having different characteristics may be used for sharing the respective partial regions. For example, JP-A No. 2002-62189 describes an example of employing two PbS detectors having different spectroscopic sensitivity characteristics for sag the near-infrared-light region.

DISCLOSURE OF THE INVENTION

Figure 1:
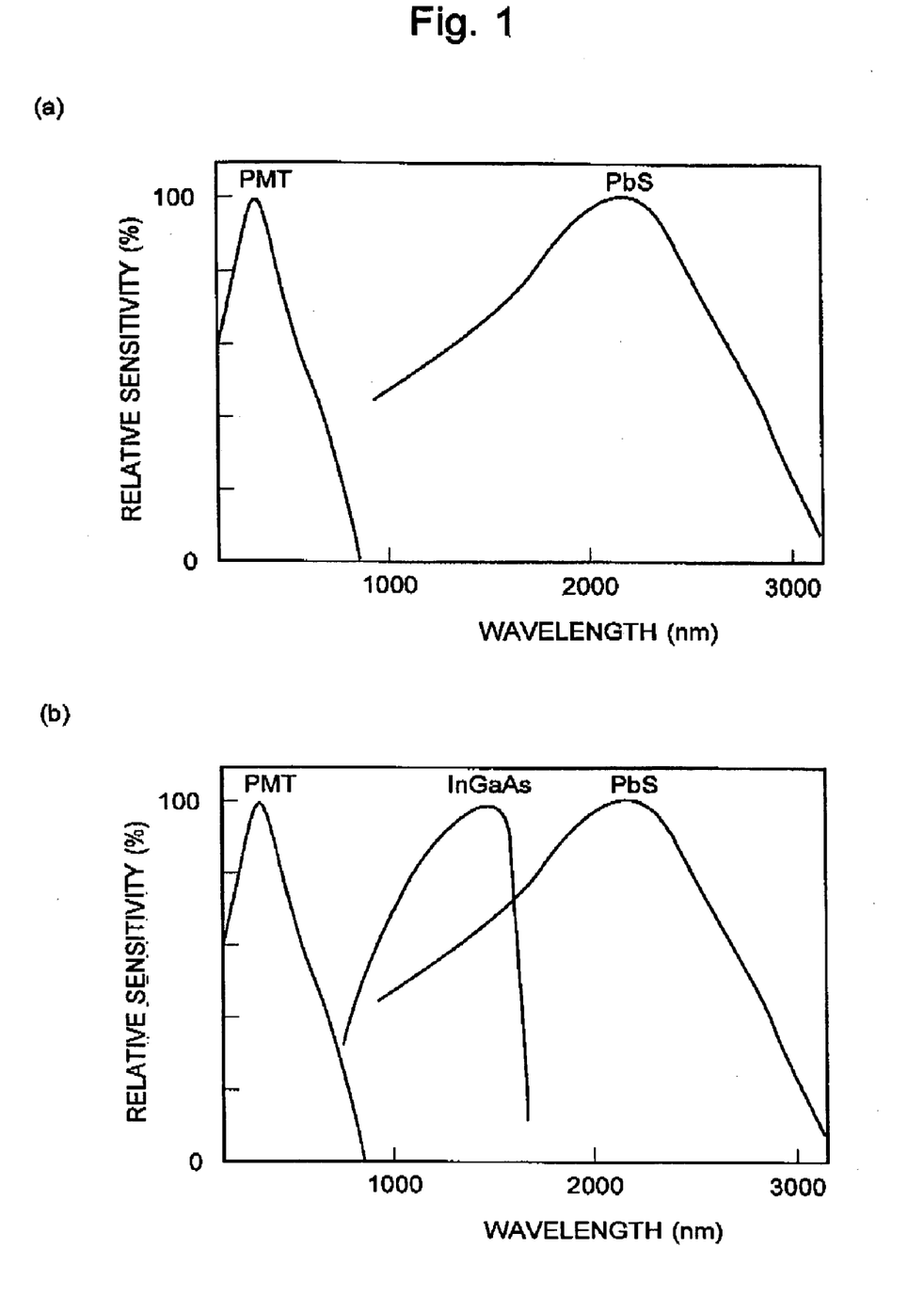
FIG. 1(a) is a graph of the sensitivity characteristics of a conventional detecting device including a photomultiplier-tube (PMT) detector and a PbS detector.
FIG. 1(b) is a graph of the sensitivity characteristics of a detecting device including a PMT detector, an InGaAs detector and a PbS detector according to the present invention.

As described above, conventional spectrophotometer detecting devices divide a wide wavelength range into plural partial regions and employ detectors having spectroscopic sensitivity characteristics suitable for the respective allocated regions. However, they tend to exhibit insufficient sensitivities at the boundary regions, thus making it difficult to provide sufficient S/N ratios. Particularly, the tendency is prominent at the boundary regions between different types of spectrophotometers. For example, switching between the photomultiplier tube sharing the ultraviolet and visible light regions and the PbS detector sharing the near-infrared-light region is generally performed around the range of 800 to 900 nm and both the detectors exhibit low sensitivities at this region as illustrated in FIG. 1(a).

Although the sensitivity of the PbS detector can be increased by cooling it, this will cause the problem of sacrificing the response speed. Further, the PbS detector is a photoconductive-type detector and thus has a problem in that there is an insufficient linear relationship between the input-light intensity and the output voltage. Particularly, the latter problem becomes serious when measurements are performed for an object having a low reflectivity such as when measurements are performed for an anti-reflection film on a component used for optical communication.

Consequently, it is an object of the present invention to provide a detecting device for a spectrophotometer capable of exhibiting a sufficient sensitivity over the ultraviolet light, visible light and near-infrared light ranges, and having an adequate linearity.

A spectrophotometer detecting device, according to the present invention made for overcoming the aforementioned problems for electromagnetic waves over ultraviolet light, visible light and near-infrared light ages, includes detectors of a photomultiplier-tube detector, an InGaAs detector and a PbS detector, and a switching device for switching among these detectors.

Alternatively, the spectrophotometer may include a single integrating sphere including these detectors placed thereon.

Further, the spectrophotometer may include output conversion means for correcting the linearity difference among these detectors.

With the detecting device according to the present invention, similar to conventional devices, a photomultiplier-tube detector is allocated to a short-wavelength range (ultraviolet-light range) out of the intended range over ultraviolet light, visible light and near-infrared light rages, a PbS detector is allocated to a long-wavelengh range (the near-infrared light range) and an InGaAs detector is allocated to the region therebetween. Namely, at least, the InGaAs detector is used for measuring in the aforementioned 800 to 900 nm range to enable detections with a high S/N ratio and less deterioration of sensitivity over the to-be-measured range covering ultraviolet light, visible light and near-infrared light ranges, as illustrated in FIG. 1(b). Further, the InGaAs is a photo diode which is a kind of photovoltaic device and thus has excellent linearity. Consequently, with the spectrophotometer according to the present invention, it is possible to improve the linearity over the wavelength range allocated to the InGaAs detector, as well as the wavelength range allocated to the photomultiplier-tube detector.

Further, by providing the aforementioned output conversion means, it is possible to eliminate the linearity difference among the detectors and, more specifically, it is possible to compensate the insufficient linearity of the PbS detector, thus eliminating fluctuations in measured data due to the nonlinearity depending on the incident-light quantity. This enables performing measurements for low reflectivity samples with low noise.

BEST MODE FOR CARRYING OUT THE INVENTION

Figure 2:
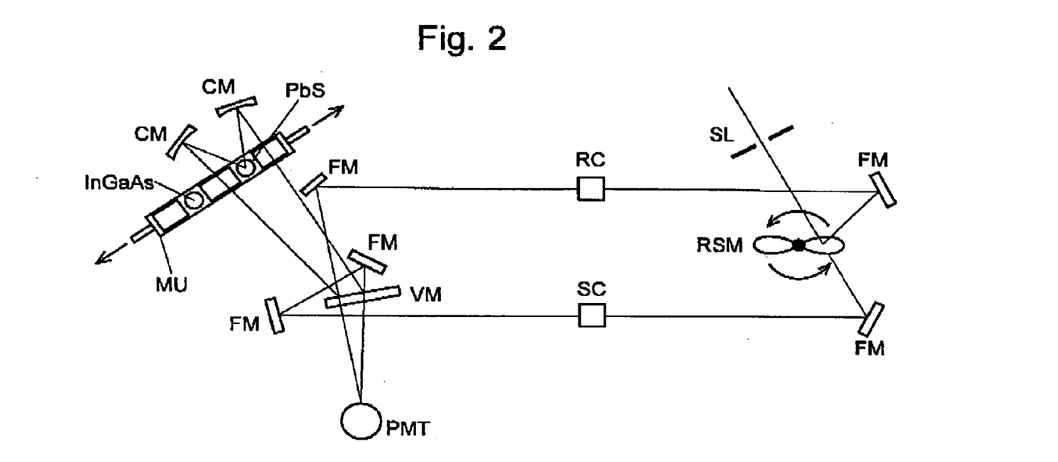
FIG. 2 is a view of the placement of a double-beam type transmitted-light measuring spectrophotometer employing the detecting device according to the present invention.

FIG. 2 illustrates an embodiment employing a detecting device according to the present invention in a double-beam type transmitted-light measuring spectrophotometer using a rotational sector mirror. Light dispersed by a spectroscope, which is not shown, passes through an outlet slit SL, then is alternately directed to a sample cell SC and a reference cell RC through a rotational sector mirror RSM, and then passes through the respective cells. The light passed through the respective cells is directed toward a PbS/InGaAs switching device MU (the upper left portion in FIG. 2) when a variable mirror VM is inserted into the light path as illustrated in FIG. 2. In this case, lights from both the cells are passed through windows of the PbS/InGaAs switching device Mu and then are focused onto a single point on the InGaAs switching device through respective concave mirrors CMs. The PbS/InGaAs switching device MU moves in the direction of the arrow to position the PbS detector or the InGaAs detector at the light focal point. On the other hand, when the variable mirror VM is moved outside the light path, lights from the respective cells are directed to a photomultiplier tube PMT. As described above, the positions of the variable mirror VM and the PbS/InGaAs switching device MU are properly controlled depending on the to-be-measured wavelength to enable spectrometry with a high sensitivity over a wide wavelength range from ultraviolet light to near infrared light.

Figure 3:
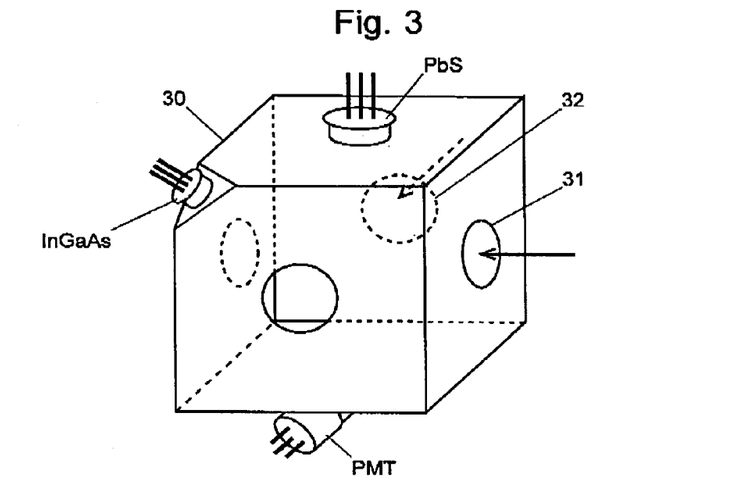
FIG. 3 is a perspective view of a detecting device employing an integrating sphere including three detectors placed thereon, according to another embodiment of the present invention.

The switching among the three types of detectors is not limited to that using such a switching mechanism. FIG. 3 illustrates an example of using an integrating sphere. In this example, a single photomultiplier tube PMT, a single PbS detector and a single InGaAs detector are placed such that their incident surfaces are faced to inner wall surfaces of the integrating sphere 30. The respective detectors are placed at positions which are not directly faced to incident openings 31 and 32 for incident lights from the sample cell and the reference cell so that incident lights are not directly incident to the respective detectors, The utilization of the integrating sphere 30 enables miniaturization of the device and elimination of movable portions, thus improving the reliability of the device.

Figure 4:
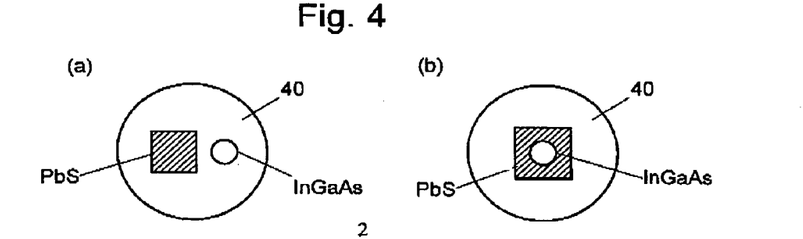
FIG. 4 shows two types of placements of an InGaAs detector and a PbS detector within a single package, as modifications to the aforementioned embodiments.

While the three detectors are placed at different positions on the integrating sphere 30 in FIG. 3, the PbS detector and the InGaAs detector may be integrated into a packaged detector and placed on a wall surface of the integrating sphere 30 as illustrated in FIG. 4. While both the detectors are laterally arranged within a package 40 in the example (a), the InGaAs detector may be placed within the detection surface of the PbS detector as illustrated in (b). This enables further miniaturizing the package 40. Since it is preferable that the integrating sphere has smaller opening areas (non-reflective surface portions), these configurations can improve the sensitivity.

Figure 5:
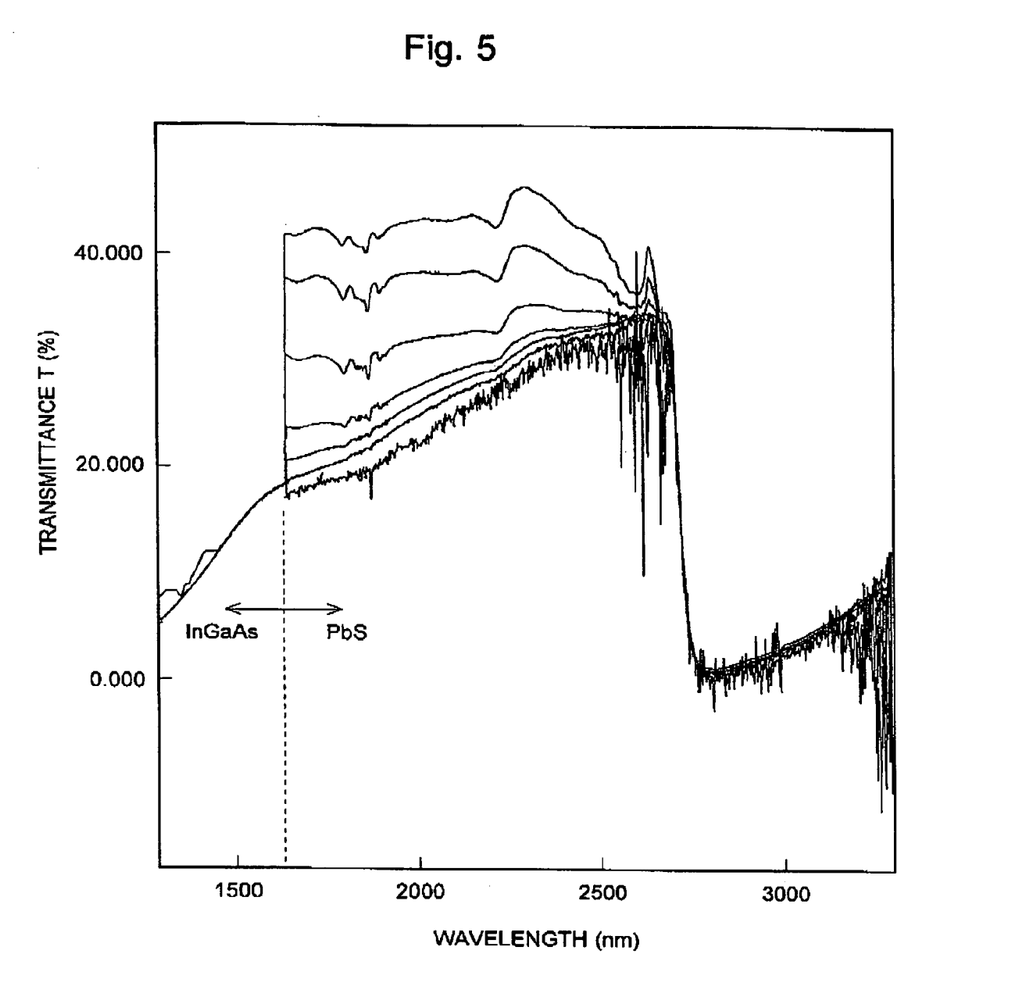
FIG. 5 is a graph of the result of measurements of the transmittance of an ND filter using a PbS detector and an InGaAs detector, wherein the incident-light quantities are varied.

FIG. 5 illustrates the result of measurements of the transmittance of an ND filter using a PbS detector and an InGaAs detector, wherein the incident-light quantity was varied by varying the width of the slit SL within the range of 0.5 mm to 12.0 mm. The switching between both the detectors was performed at a wavelength of 1650 nm. It can be seen that measured transmittance values obtained by the PbS detector allocated to the longer-wavelength range vary depending on the slit width, while spectra obtained by the InGaAs detector allocated to the shorter-wavelength range coincide with one another regardless of the slit width. Conventional detecting devices perform switching between a PMT detector and a PbS detector at a wavelength within the range of 800 to 900 nm (for example, 830 nm) and have poor linearity in longer-wavelength ranges as previously described, but the utilization of the detecting device according to the present embodiment cam realize excellent linearity for wavelengths up to 1650 nm.

Figure 6:
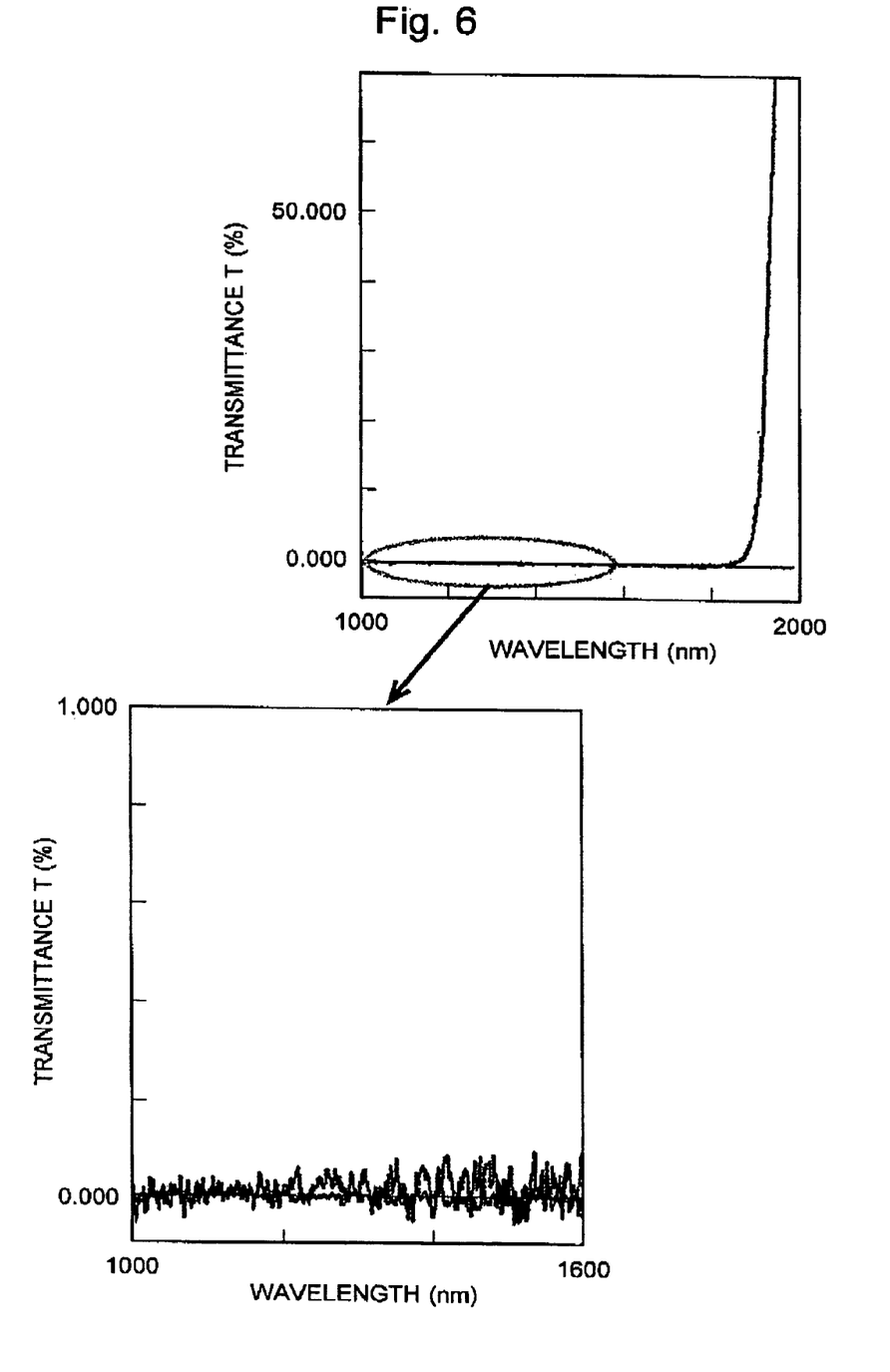
FIG. 6 is a graph of the result of measurements of the transmittance of a near-infrared-light cutoff filter obtained by the InGaAs detector within the range of 1000 to 1600 nm.

FIG. 6 illustrates the transmittance of a near-infrared-light cutoff filter measured by an InGaAs detector for a wavelength range of 1000 nm to 1600 nm. It can be seen that the InGaAs detector exhibited a favorable S/N ratio.

Figure 7:
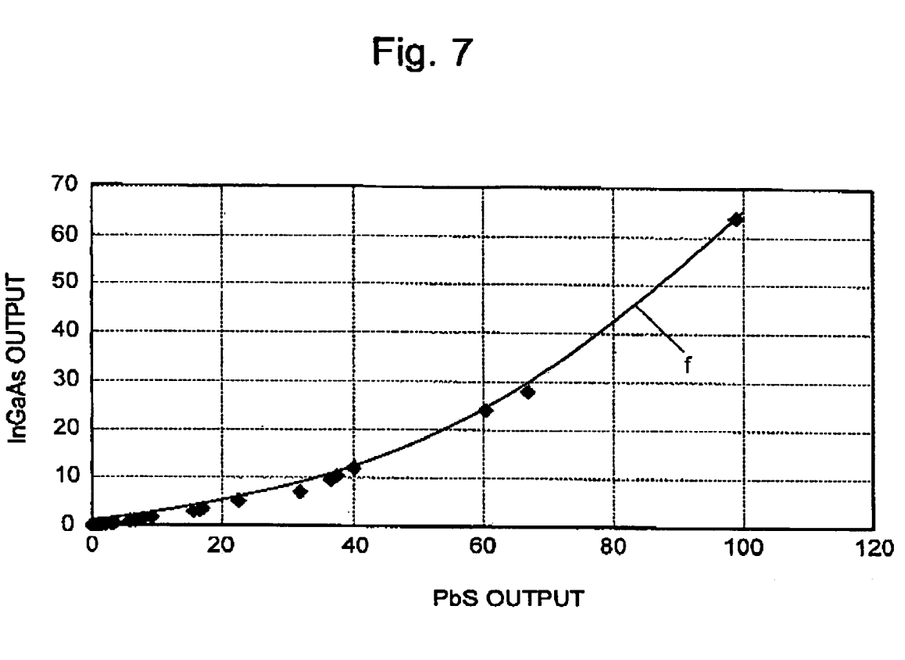
FIG. 7 is a graph plotting the output of the PbS detector and the output of the InGaAs detector for the same inputs (with a wavelength of 1650 nm).

By switching among three types of detectors as described above, a favorable sensitivity and a favorable S/N ratio can be realized particularly for the medium-wavelength range. When data analyses, etc., are to be performed on the basis of outputs from the detectors, it is desirable that there is linearity between the intensity of the input light quantity and the output signal. However, while the photomultiplier tube and the InGaAs detector are photovoltaic-type detectors and thus have excellent linearity as previously described, the PbS detector is a photoconductive detector and thus exhibits significant nonlinearity particularly in high input regions. FIG. 7 is a graph plotting the output of the PbS detector and the output of the InGaAs detector for the same inputs (with the wavelength of 1650 nm), wherein it is clear that the PbS detector has the characteristic that its output value can not be linearly increased, particularly for high inputs.

Figure 8:
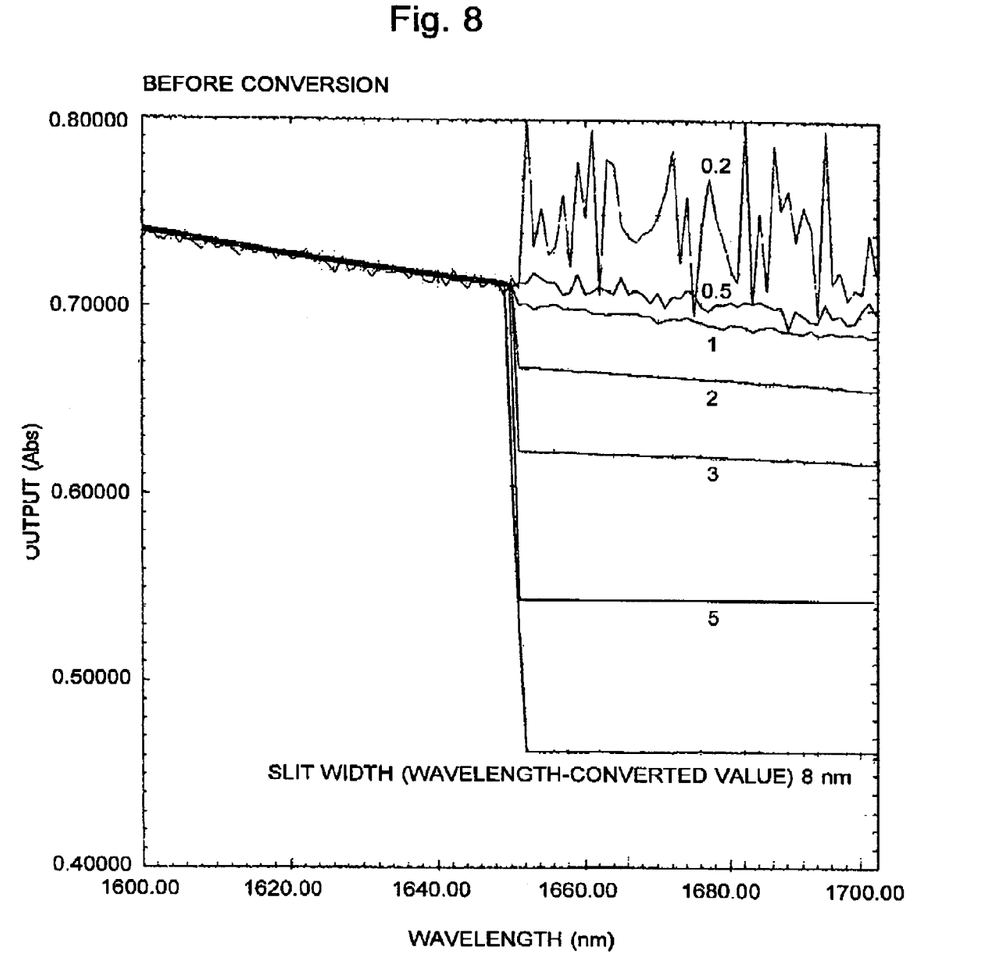
FIG. 8 is a graph illustrating the changes in the outputs of the InGaAs detector and the PbS detector, in the case where the output of the PbS detector is not converted, wherein the input light quantity is used as the parameter.

Consequently, if measurements are performed through the Inks detector and the PbS detector, discontinuous level differences will occur in the transmittance and the absorbance at the wavelength at which switching between both the detectors is performed. FIG. 8 is a graph representing absorption-output changes at the switching point between the InGaAs detector (the left side) and the PbS detector (the right side) for various values of the input-light quantity. The measured object was an ND filter with the transmittance of about 30% and the input light quantity was varied by varying the slit width among, on the wavelength base, 0.2 nm, 0.5 mm, 1 nm, 2 nm, 3 nm, 5 nm, 8 nm. As can be clearly seen from the graph, the output of the PbS detector significantly decreases with increasing input light quantity.

Therefore, as illustrated in FIG. 10(a), an analog-signal conversion circuit CV is provided at the output side of the PbS detector to ensure the linearity of the input-output characteristic. More specifically, in order to compensate the output characteristic of the PbS detector as illustrated in FIG. 7, the graph is represented by a mathematical expression and, on the basis of the mathematical expression, the input-output characteristic is linearized with the conversion circuit CV. A polynomial equation of a suitable order for the desired accuracy can be utilized as the conversion equation and, in actuality, a cubic polynomial equation can be used to sufficiently attain the object. For example, the plots of FIG. 7 can be adequately approximated by a cubic curve f represented by the following equation.

$$y_1 = Ax_1^3 + Bx_1^2 + Cx_1$$

The above conversion equation is composed of a linear equation ($Cx_1$) which passes through the origin plus perturbation terms ($Ax_1^3+Bx_1^2$). Therefore, the output of the InGaAs detector is projected onto the curve $y=Cx$ to obtain a linear output $X_2$.

$$y_1=Cx_2$$

Namely, the output $x_1$ of the PbS detector is converted into $x_2$ using the following equation to obtain an output with linearity and having no level difference at the switching point.

$$x_2=y_1/C=(A/C)x_1^3+(B/C)x_1^2+x_1$$

Figure 9:
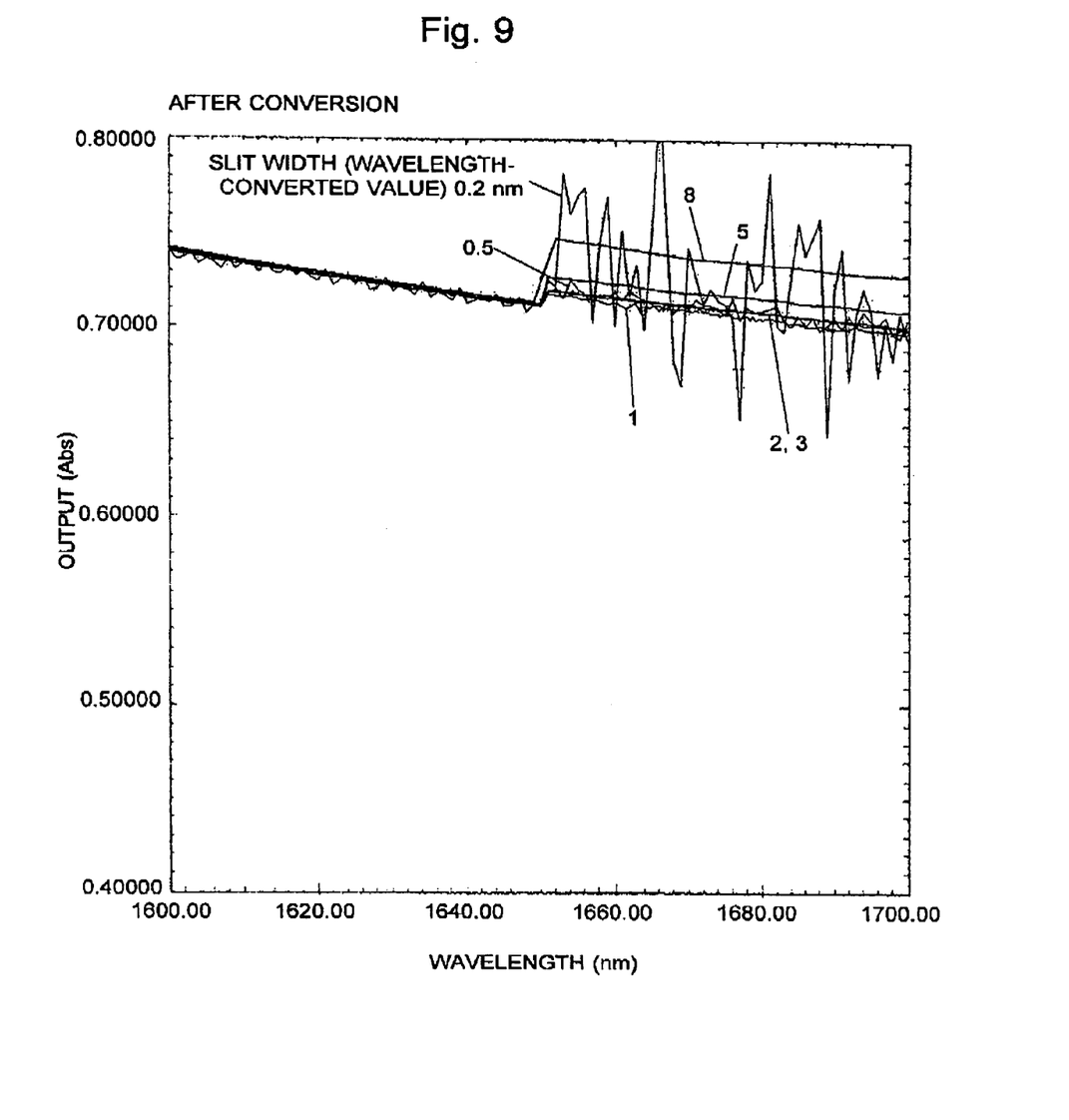
FIG. 9 is a graph illustrating the changes in the outputs of the InGaAs detector and the PbS detector, in the case where the output of the PbS detector is converted, wherein the input light quantity is used as the parameter.
Figure 10:
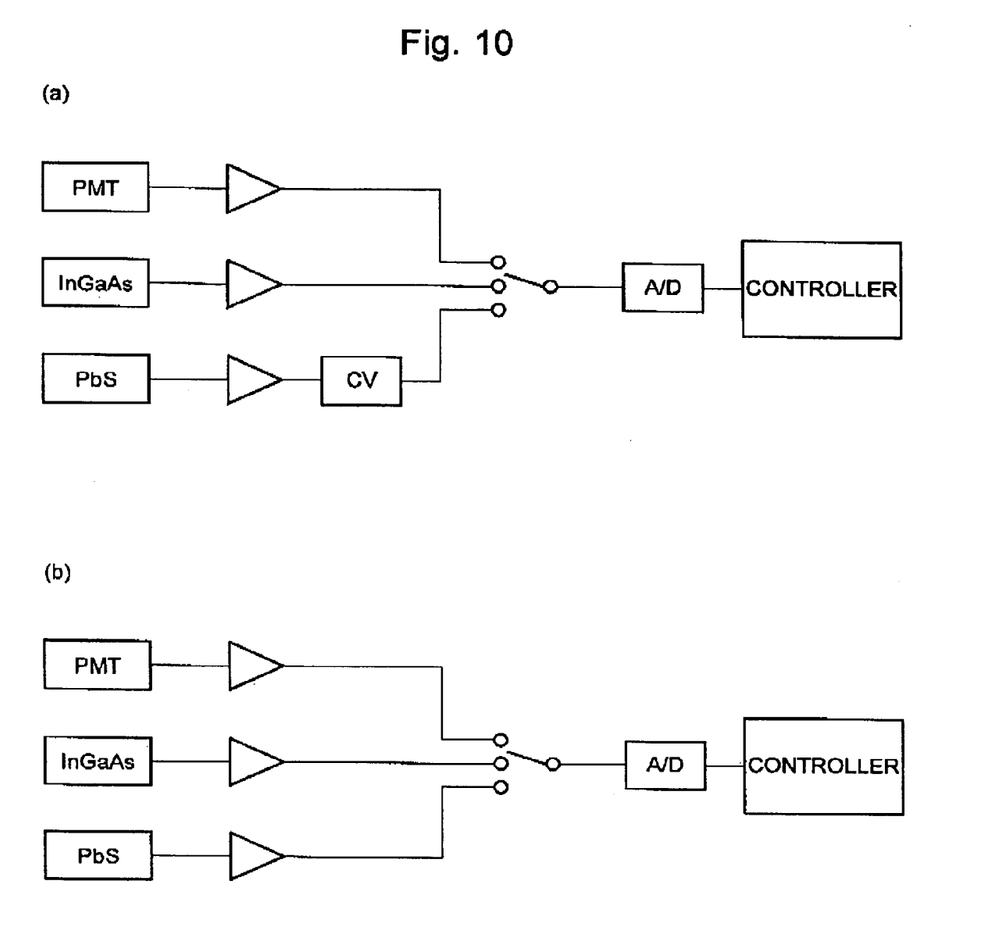
FIG. 10(a) is a circuit diagram including an analog-output conversion circuit for performing conversion of the output of the PbS detector.
FIG. 10(b) is a circuit diagram for performing conversion in a software manner.

FIG. 9 illustrates the output changes occurred between the InGaAs detector and the PbS detector in measurements under the same condition as that of FIG. 8, in the case of employing this conversion equation in the analog-signal conversion circuit CV of FIG. 10(*a*). It can be seen that output level differences depending on the input light quantity at the switching wavelength as observed in FIG. 8 were significantly reduced.

Also, instead of using a single equation as described above, the wavelength range may be divided into several segments, and different equations may be used for the respective segments. This enables more accurate conversion.

Further, while in the aforementioned embodiment the analog output of the PbS detector is converted as illustrated in FIG. 10(*a*), digitized signals may be converted. In this case, as illustrated in FIG. 10(*b*), the analog-signal conversion circuit CV is unnecessary and a controlling portion (or a data analyzing portion) performs data conversion in a software manner.

The invention claimed is:

1. A detecting device for a spectrophotometer covering electromagnetic waves over ultraviolet light, visible light and near-infrared light ranges, the detecting device comprising detectors of a photomultiplier-tube detector, an InGaAs detector and a PbS detector, and a switching device for switching among these detectors.

2. A detecting device for a spectrophotometer covering electromagnetic waves over ultraviolet light, visible light and near-infrared light ranges, the detecting device comprising detectors of a photomultiplier-tube detector, an InGaAs detector and a PbS detector, and a single integrating sphere including these detectors placed thereon.

3. The ultraviolet light, visible light and near-infrared light spectrophotometer detecting device according to claim 1 or 2, comprising output conversion means for correcting the output linearity difference among said detectors.

4. The ultraviolet light, visible light and near-infrared light spectrophotometer detecting device according to claim 3, wherein said conversion means is an analog-signal conversion means for converting analog outputs from the PbS detector.

5. The ultraviolet light, visible light and near-infrared light spectrophotometer detecting device according to claim 3, wherein said conversion means is a digital-data conversion means for correcting digital data created by digitizing analog outputs from the PbS detector.

6. The ultraviolet light, visible light and near-infrared light spectrophotometer detecting device according to claim 3, wherein said conversion means uses a cubic equation.

7. The ultraviolet light, visible light and near-infrared light spectrophotometer detecting device according to claim 4, wherein said conversion means uses a cubic equation.

8. The ultraviolet light, visible light and near-infrared light spectrophotometer detecting device according to claim 5, wherein said conversion means uses a cubic equation.

* * * * *